(12) United States Patent
Wakefield et al.

(10) Patent No.: US 11,334,700 B1
(45) Date of Patent: May 17, 2022

(54) COMPREHENSIVE THERMAL MAPPING OF AN ELECTRONIC CIRCUIT DESIGN THROUGH DESIGN SIMULATION

(71) Applicant: Synopsys, Inc., Mountain View, CA (US)

(72) Inventors: Alexander John Wakefield, Fort Lauderdale, FL (US); Jitendra Kumar Gupta, Pleasanton, CA (US)

(73) Assignee: Synopsys, Inc., Mountain View, CA (US)

( * ) Notice: Subject to any disclaimer, the term of this patent is extended or adjusted under 35 U.S.C. 154(b) by 43 days.

(21) Appl. No.: 16/875,238

(22) Filed: May 15, 2020

Related U.S. Application Data

(60) Provisional application No. 62/848,025, filed on May 15, 2019.

(51) Int. Cl.
| | |
|---|---|
| *G06F 17/10* | (2006.01) |
| *G06F 30/367* | (2020.01) |
| *G06F 119/06* | (2020.01) |
| *G06F 119/08* | (2020.01) |

(52) U.S. Cl.
CPC ........ *G06F 30/367* (2020.01); *G06F 2119/06* (2020.01); *G06F 2119/08* (2020.01)

(58) Field of Classification Search
CPC ...... G06F 30/20; G06F 30/367; G06F 30/392; G06F 30/30; G06F 30/3312; G06F 2119/06; G06F 2119/12; G06F 2119/08
See application file for complete search history.

(56) References Cited

U.S. PATENT DOCUMENTS

| 7,472,363 B1 * | 12/2008 | Chandra | ............... G06F 30/398 |
| | | | 716/106 |
| 2009/0019411 A1 * | 1/2009 | Chandra | ................. G06F 30/20 |
| | | | 716/119 |

(Continued)

OTHER PUBLICATIONS

Schafer et al. Hotspots Elimination and Temperature Flattening in VLSI Circuits IEEE Transactions on Very Large Scale Integration (VLSI) Systems, vol. 16, No. 11, Nov. 2008 (Year: 2008).*

(Continued)

*Primary Examiner* — Rehana Perveen
*Assistant Examiner* — Cuong V Luu
(74) *Attorney, Agent, or Firm* — Sterne, Kessler, Goldstein & Fox P.L.L.C.

(57) ABSTRACT

A simulation application can be executed by a computer system to develop thermal maps for an electronic architectural design. The simulation application can simulate the electronic architectural design over time. The simulation application can capture electronic signals from the electronic architectural design as the electronic architectural design is being simulated over time. The simulation application can determine power consumptions of the electronic architectural design over time from the electronic signals. The simulation application can derive temperatures of the electronic architectural design over time from the power consumptions. The simulation application can map the temperatures onto an electronic circuit design real estate of the electronic architectural design to develop the thermal maps over time.

20 Claims, 12 Drawing Sheets

(56) References Cited

U.S. PATENT DOCUMENTS

| | | | | |
|---|---|---|---|---|
| 2014/0278333 A1* | 9/2014 | Gupta | ................... | H04L 41/145 |
| | | | | 703/18 |
| 2015/0261898 A1* | 9/2015 | Gupta | .................. | G06Q 10/063 |
| | | | | 703/18 |
| 2020/0363856 A1* | 11/2020 | Kulkarni | ............... | G06F 1/3203 |

OTHER PUBLICATIONS

Ziabari et al. Power Blurring: Fast Static and Transient Thermal Analysis Method for Packaged Integrated Circuits and Power Devices IEEE Transactions on Very Large Scale Integration (VLSI) Systems, vol. 22, No. 11, Nov. 2014 (Year: 2014).*

Liu et al. Thermal_Aware Task Mapping on Dynamically Reconfigureable Network-on-Chip Based Multiprocessor System-on-Chip IEEE Transactions on computers, vol. 67, No. 12, Dec. 2018 (Year: 2018).*

* cited by examiner

COMPREHENSIVE THERMAL MAPPING OF AN ELECTRONIC CIRCUIT DESIGN THROUGH DESIGN SIMULATION

CROSS-REFERENCE TO RELATED APPLICATIONS

The present application claims the benefit of U.S. Patent Appl. No. 62/848,025 filed on May 15, 2019, which is incorporated herein by reference in its entirety.

TECHNICAL FIELD

The present disclosure relates to thermal analysis of an electronic circuit design and including determining power consumption and/or temperature of the electronic circuit design through simulating the electronic circuit design over time.

BACKGROUND

The continued improvement of semiconductor fabrication processes has allowed manufacturers and designers to create smaller, more powerful electronic circuit designs. The semiconductor fabrication processes have progressed from a 10 μm semiconductor fabrication process that was reached around 1971 to a 22 nm semiconductor fabrication process that was reached around 2012. The semiconductor device fabrication processes have progressed into a limited risk 5 nm semiconductor fabrication process. However, with each progression of the semiconductor fabrication process, more electronic components are being placed into smaller areas and at ever increasing densities. As these electronic components operate, they dissipate heat throughout these smaller, more powerful electronic circuit designs. Typically, these electronic components are designed to operate over a specified temperature range with upper limits generally set at 70° C. for commercial applications, 85° C. for industrial applications, and 125° C. for military applications to provide some examples. Manufacturers and designers of these smaller, more powerful electronic circuit designs often perform a thermal analysis of these smaller, more powerful electronic circuit designs to ensure that their operating temperature remains within this specified temperature range.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Manufacturers and designers of electronic devices often perform a thermal analysis of these electronic devices to ensure that their operating temperature remains within a specified temperature range with upper limits generally set at 70° C. for commercial applications, 85° C. for industrial applications, and 125° C. for military applications to provide some examples. Operating these electronic devices above this specified temperature range can cause thermal fatigue which results in macroscopic cracks from cyclic thermal stresses and strains due to temperature changes, spatial temperature gradients, and high temperatures to provide some examples. Conventionally, these manufacturers and designers often simulate these electronic devices to develop a Value Change Dump (VCD) file and/or Switching Activity Interchange Form (SAIF) file which records switching activity of various circuits nodes within these electronic devices. These manufacturers and designers thereafter utilize these files to estimate the operating temperature over the simulation, as referred to as a thermal snapshot. However, this thermal snapshot effectively amounts to an averaging of the operating temperature over the simulation. Often times, thermal hotspots, where the operating temperature of these electronic devices exceeds the specified temperature range occur throughout the simulation. In some situations, these thermal hotspots occur over a relatively short duration in time over the simulation and are effectively averaged out in the thermal snapshot.

The exemplary electronic design platform, as to be described in further detail below, effectively develops thermal maps over time to effectively capture thermal hotspots that occur over these relatively short instances in time. As to be described in further detail below, the electronic design platform receives electronic signals from an electronic architectural design as the electronic architectural design is being simulated over time. The electronic design platform determines the power consumption of the electronic architectural design from these electronic signals to develop power consumption maps for the electronic architectural design over time. Thereafter, the electronic design platform utilizes the power consumption of the electronic architectural design to derive temperatures of the electronic architectural design to develop thermal maps for the electronic architectural design over time.

Figure 1:
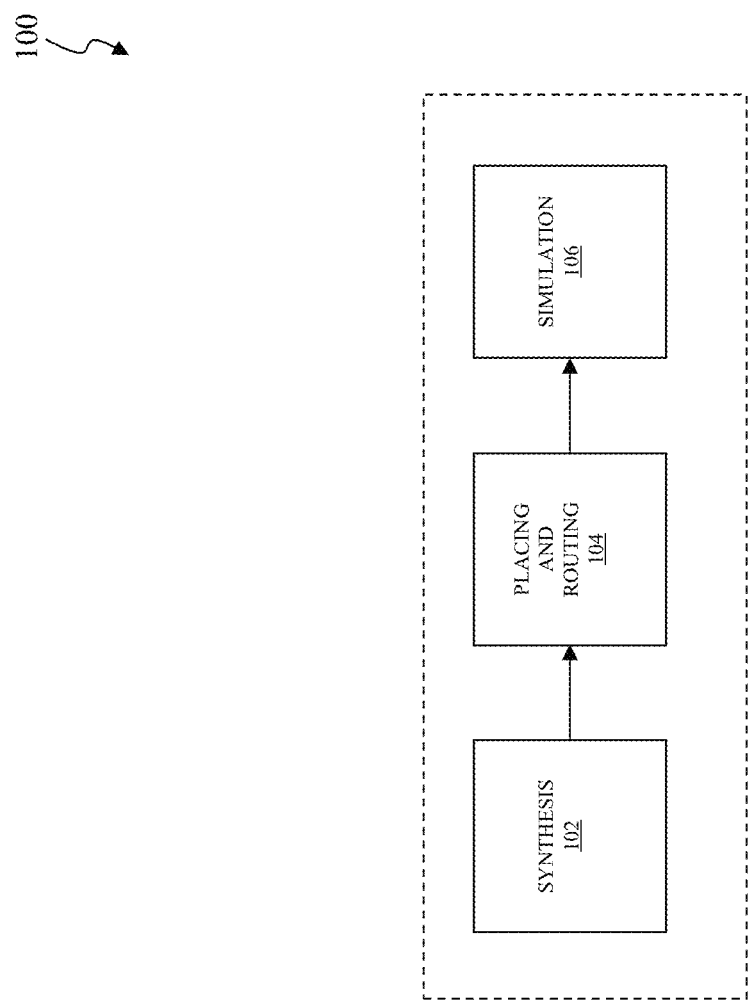
FIG. 1 illustrates a block diagram of an exemplary electronic design platform according to an exemplary embodiment of the present disclosure.

As to be described in further detail below, the exemplary electronic design platform can analyze the thermal maps to detect three-dimensional thermal hotspots, also referred to as thermal heat-balls, within the thermal maps that occur within the electronic architectural design over relatively short durations in time. These three-dimensional thermal hotspots would be otherwise averaged out by the conventional thermal snapshot. The exemplary electronic design platform can thereafter utilize the thermal maps to adjust placement of analog components and/or digital components within the electronic architectural design to lessen, for example, minimize, the one or more three-dimensional thermal heat-balls as to be described in further detail below, Exemplary Electronic Design Platform FIG. 1 illustrates a block diagram of an exemplary electronic design platform according to an exemplary embodiment of the present disclosure. In the exemplary embodiment illustrated in FIG. 1, an electronic design platform 100 can simulate an electronic architectural design to verify the functionality of an electronic circuit design. As part of this simulation, the electronic design platform 100 can develop one or more power consumption maps which graphically illustrate power consumed by the electronic architectural design, and/or a portion thereof. The electronic design platform 100 can further derive one or more thermal maps based upon the power consumption of the electronic architectural design, and/or the portion thereof, which graphically illustrate the temperature of the electronic architectural design, and/or the portion thereof. In the exemplary embodiment illustrated in FIG. 1, the electronic design platform 100 includes a synthesis application 102, a placing and routing application 104, and a simulation application 106.

In the exemplary embodiment illustrated in FIG. 1, the electronic design platform 100 represents a design flow including one or more electronic design software applications, that when executed by one or more computing devices, processors, controllers, or other devices that will be apparent to those skilled in the relevant art(s) without departing from the scope of the present disclosure, can design, simulate, analyze, and/or verify one or more high-level software level descriptions of the electronic circuit design to develop and to test the electronic architectural design. The electronic design platform 100 can be implemented in hardware, firmware, software, or any combination thereof. The electronic design platform 100 can also be implemented as instructions stored on a machine-readable medium, which can be read and executed by one or more processors. A machine-readable medium can include any mechanism for storing or transmitting information in a form readable by a machine (e.g., a computing device). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc. In an exemplary embodiment, the synthesis application 102, the placing and routing application 104, and/or the simulation application 106 can represent one or more electronic design software applications, which when executed by one or more computing devices, processors, controllers, or other devices that will be apparent to those skilled in the relevant art(s) without departing from the spirit and the scope of the present disclosure, configure the one or more computing devices, the processors, the controllers, or the other devices from being general purpose electronic devices into special purpose electronic devices to execute one or more of these applications as to be described in further detail below.

The synthesis application 102 translates one or more characteristics, parameters, or attributes of the electronic circuit design into one or more logic operations, one or more arithmetic operations, one or more control operations, and/or any other suitable operation or operations that will be apparent to those skilled in the relevant art(s) without departing from the spirit and the scope of the present disclosure into one or more high-level software level descriptions in relation to one or more analog and/or one or more digital circuits of the electronic circuit design. In some embodiments, the one or more high-level software level descriptions can be implemented using a high-level software language, such as a graphical design application, for example C, System C, C++, LabVIEW®, and/or MATLAB®, a general purpose system design language, such as a systems modeling language (SML), a semantic model definition language (SMDL), and/or a store schema definition language (SSDL), or any other suitable high-level software or general purpose system design language that will be apparent to those skilled in the relevant art(s) without departing from the scope of the present disclosure, or a high-level software format, such as Common Power Format (CPF), Unified Power Formant (UPF), or any other suitable high-level software format that will be apparent to those skilled in the relevant art(s) without departing from the spirit and the scope of the present disclosure. In some embodiments, the synthesis application 102 can simulate the one or more logic operations, the one or more arithmetic operations, the one or more control operations, and/or the other suitable operation or operations to verify these operations perform in accordance with the one or more characteristics, parameters, or attributes of the electronic circuit design. In these embodiments, the one or more characteristics, parameters, or attributes of the electronic circuit design can be outlined in an electronic design specification.

The placing and routing application 104 translates the one or more high-level software level descriptions into planar geometric shapes, locations of these planar geometric shapes, and/or the interconnections between these planar geometric shapes to form the electronic architectural design for the electronic circuit design. The placing and routing application 104 can select planar geometric shapes which define analog components and/or digital components for the one or more analog and/or one or more digital circuits to implement the one or more logic operations, the one or more arithmetic operations, the one or more control operations, and/or the other suitable operation or operations of the one or more high-level software level descriptions. After selecting the analog components and/or the digital components, the placing and routing application 104 thereafter places these analog components and/or these digital components onto an electronic circuit design real estate to initiate formation of the electronic architectural design for the electronic circuit design. After placing these analog components and/or these digital components onto the electronic circuit design real estate, the placing and routing application 104 routes these components to each other to form the electronic architectural design for the electronic circuit design.

The simulation application 106 simulates the electronic architectural design to replicate one or more characteristics, parameters, or attributes of the electronic architectural design. In the exemplary embodiment illustrated in FIG. 1, the simulation application 106 can simulate the electronic architectural design, or a portion thereof, to develop the one or more power consumption maps for the electronic architectural design over time and/or the one or more thermal maps for the electronic architectural design over time. The simulation application 106 can capture one or more states of the analog components and/or the digital components and/or electronic signals within the electronic architectural design over time and can thereafter analyze the one or more states and/or the electronic signals to determine power consumption of the electronic architectural design to develop the one or more power consumption maps. The simulation application 106 can thereafter derive the one or more thermal maps over time based upon the power consumption of the electronic architectural design. In some embodiments, the simulation application 106 can determine the power consumption of the analog components and/or digital components from the one or more states and/or the electronic signals over time to develop the one or more power consumption maps for the electronic architectural design, or the portion thereof, as to be described in further detail below. In some embodiments, the simulation application 106 can thereafter derive the one or more thermal maps for the electronic architectural design as to be described in further detail below, based upon the power consumption of the electronic architectural design.

In some embodiments, the placing and routing application 104 can utilize the one or more power consumption maps and/or the one or more thermal maps to adjust the placement of the analog components and/or digital components onto the electronic circuit design real estate. For example, the one or more thermal maps can indicate that a first analog component and/or a first digital component within the electronic architectural design generates an undesirable amount thermal heat during the simulation of the electronic architectural design which could, for example, interfere with operation of a second analog component and/or a second digital component within the electronic architectural design. In this example, the placing and routing application 104 can adjust the placement of the first analog component and/or the first digital component to be farther away from the second analog component and/or the second digital component. In some embodiments, the placing and routing application 104 can iteratively adjust the placement of the analog components and/or the digital components onto the electronic circuit design real estate and can thereafter route these placed components to each other to form a new electronic architectural design for the electronic circuit design. In these embodiments, the placing and routing application 104 can, for each iteration, adjust the placement of the analog components and/or the digital components onto the electronic circuit design real estate based upon the one or more power consumption maps and/or the one or more thermal maps to form the new electronic architectural design and thereafter simulate the new electronic architectural design to develop one or more new power consumption maps and/or one or more new thermal maps. In some embodiments, the placing and routing application 104 can continue to adjust the placement of the analog components and/or the digital components onto the electronic circuit design real estate until the one or more new power consumption maps and/or the one or more new thermal maps satisfies an electronic design constraint, for example, an upper limit to an operating temperature which is generally set at 70° C. for commercial applications, 85° C. for industrial applications, and 125° C. for military applications to provide some examples.

Exemplary Power Consumption Map

As described above in FIG. 1, a computer system, an exemplary embodiment of which is to be described in further detail below, executing the simulation application 106, can capture electronic signals within the electronic architectural design as the simulation application 106 is simulating the electronic architectural design for the electronic circuit design. The computer system can thereafter analyze the electronic signals to develop the one or more power consumption maps as to be described in further detail below in FIG. 2A through FIG. 2E.

FIG. 2A through FIG. 2E graphically illustrates exemplary power consumption maps generated by the exemplary electronic design platform. As described above, a computer system executing a simulation application, such as the simulation application 106 to provide an example, can simulate an electronic architectural design for an electronic circuit design to replicate one or more characteristics, parameters, or attributes of the electronic architectural design. As part of this simulation, the simulation application can capture electronic signals within the electronic architectural design over time and can thereafter analyze these electronic signals over time to develop the one or more power consumption maps for the electronic architectural design over time.

Figure 2A:
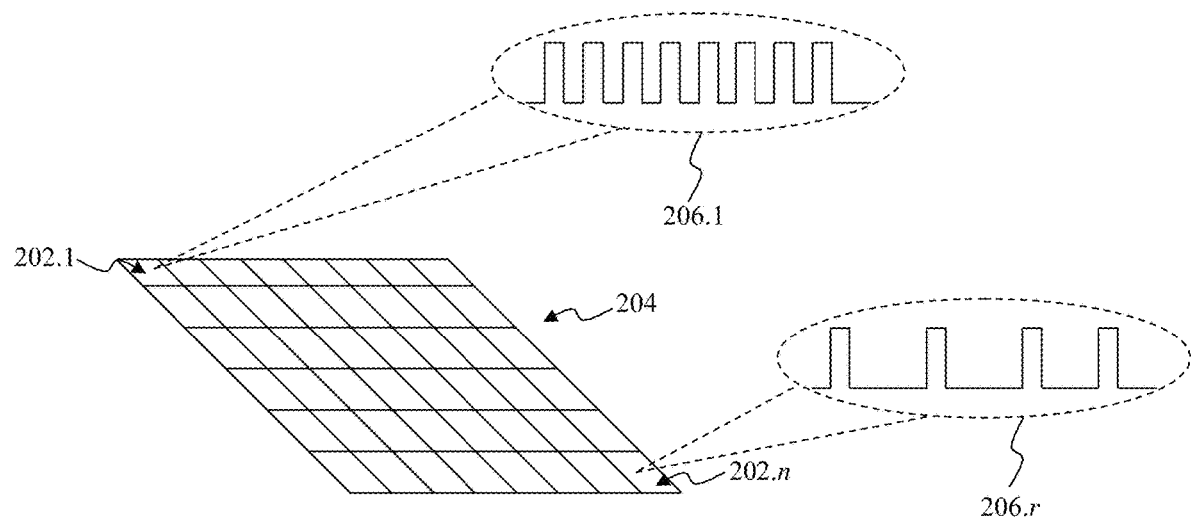
FIG. 2A through FIG. 2E graphically illustrates exemplary power consumption maps generated by the exemplary electronic design platform according to exemplary embodiments of the present disclosure.
Figure 2B:
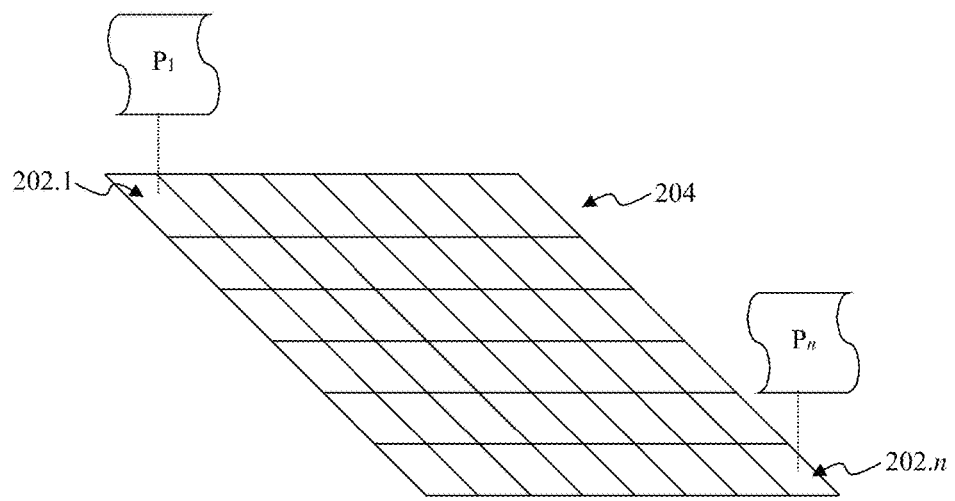

In the exemplary embodiment illustrated in FIG. 2A through 2E, a computer system executing a placing and routing application, such as the placing and routing application 104 to provide an example, places analog components and/or digital components of the electronic circuit design onto an electronic circuit design real estate and thereafter routes these analog components and/or these digital components to each other to form the electronic architectural design. As illustrated in FIG. 2A, the simulation application can virtually partition the electronic circuit design real estate into real estate partitions 202.1 through 202.$n$ having various planar geometric shapes from the electronic architectural design and/or various interconnections between these planar geometric shapes to develop an electronic circuit design real estate map 204. This virtual partitioning can be a distance-based partitioning of the electronic circuit design real estate as illustrated in FIG. 2A; however, other partitioning of the electronic circuit design real estate, such as component-based partitioning or circuit-based partitioning to provide some examples, are possible as will be apparent to those skilled in the relevant art(s) without departing from the spirit and scope of the present disclosure. In some embodiments, the real estate partitions 202.1 through 202.$n$ can include one or more planar geometric shapes of the for the electronic circuit design and/or one or more interconnections between these planar geometric shapes.

Moreover, in the exemplary embodiment illustrated in FIG. 2A, the real estate partitions 202.1 through 202.$n$ are configured to be regular closed geometric structures, such as rectangles to provide an example, which are arranged to be in a series of rows and a series of columns to form a matrix of real estate partitions. However, those skilled in the relevant art(s) will recognize that the configuration and/or the arrangement of the real estate partitions 202.1 through 202.$n$ can be implemented differently without departing from the spirit and scope of the present disclosure. The real estate partitions 202.1 through 202.$n$ can be configured to be other regular closed geometric structures, one or more irregular closed structures, such as one or more irregular polygons to provide an example, and/or any suitable combination of closed structures that will be apparent to those skilled in the relevant art(s). Although the real estate partitions 202.1 through 202.$n$ as illustrated in FIG. 2A have substantially similar dimensions, those skilled in the relevant art(s) will recognize that other dimensions, whether similar or dissimilar, are possible. Moreover, the analog components and/or the digital components within each real estate partition from among the real estate partitions 202.1 through 202.$n$ can differ based upon the electronic circuit design and/or the electronic architectural design. In some embodiments, each real estate partition from among the real estate partitions 202.1 through 202.*n* can include a similar or a dissimilar number of analog components and/or digital components when compared to each other. In some embodiments, not all of the real estate partitions from among the real estate partitions 202.1 through 202.*n* need to include analog components and/or digital components.

As illustrated in FIG. 2A, the simulation application can capture electronic signals 206.1 through 206.*r* from the real estate partitions 202.1 through 202.*n* as the simulation application is simulating the electronic circuit design. In the exemplary embodiment illustrated in FIG. 2A, the electronic signals 206.1 through 206.*r* represent one or more electronic signals that are generated by the analog components and/or the digital components within the real estate partitions 202.1 through 202.*n* as the simulation application is simulating the electronic circuit design. Alternatively, or in addition to, the electronic signals 206.1 through 206.*r* can include electronic signals traversing within the real estate partitions 202.1 through 202.*n* as the simulation application is simulating the electronic circuit design. Alternatively, or in addition to, the electronic signals 206.1 through 206.*r* can include electronic signals, referred to as simulation input signals, which are provided by the simulation application to simulate the electronic circuit design. In some embodiments, the simulation application can store information, such as average activity data over time, relating to the electronic signals 206.1 through 206.*r* in one or more data files, such as a Value Change Dump (VCD) file and/or a Switching Activity Interchange Form (SAIF) file describing the one or more states of the analog components and/or the digital components and/or the electronic signals within the electronic architectural design to provide some examples, and thereafter utilize the information from these data files to develop the one or more power consumption maps as to be described in further detail below in FIG. 2A through 2E and/or one or more thermal maps as to be described in further detail below in FIG. 3A through 3E.

In the exemplary embodiment illustrated in FIG. 2A, the simulation application can capture the electronic signals 206.1 through 206.*r* over time as the simulation application is simulating the electronic circuit design. In some embodiments, the simulation application can capture one corresponding electronic signal from among the electronic signals 206.1 through 206.*r* over time from one or more of the real estate partitions 202.1 through 202.*n*. For example, as illustrated in FIG. 2A, the simulation application can capture the electronic signal 206.1 from the real estate partition 202.1. Alternatively, or in addition to, the simulation application can capture two or more corresponding electronic signals from among the electronic signals 206.1 through 206.*r* over time from one or more of the real estate partitions 202.1 through 202.*n*. As another example, as illustrated in FIG. 2A, the simulation application can capture the electronic signal 206.1 and the electronic signal 206.2 (not illustrated in FIG. 2A) from the real estate partition 202.1. In some embodiments, the simulation application need not capture electronic signals from all of the real estate partitions 202.1 through 202.*n*.

After capturing the electronic signals 206.1 through 206.*r* from the real estate partitions 202.1 through 202.*n*, the simulation application can thereafter utilize the electronic signals 206.1 through 206.*r* to determine the power consumption of the electronic architectural design. In the exemplary embodiment illustrated in FIG. 2B, the simulation application can determine power consumptions $P_1$ through $P_n$ which correspond to power consumptions of the analog components and/or the digital components within the real estate partitions 202.1 through 202.*n* utilizing the electronic signals 206.1 through 206.*r* over a corresponding instance in time. In some embodiments, the simulation application can utilize any suitable well-known mathematical calculation to determine total power consumptions of the analog components and/or the digital components within the real estate partitions 202.1 through 202.*n* over the corresponding instance in time from the electronic signals 206.1 through 206.*r*, to determine dynamic power consumptions of the analog components and/or the digital components within the real estate partitions 202.1 through 202.*n* over the corresponding instance in time from the electronic signals 206.1 through 206.*r*, and/or to determine switching energies of the analog components and/or the digital components within the real estate partitions 202.1 through 202.*n* over the corresponding instance in time from the electronic signals 206.1 through 206.*r* to provide some examples.

Figure 2C:
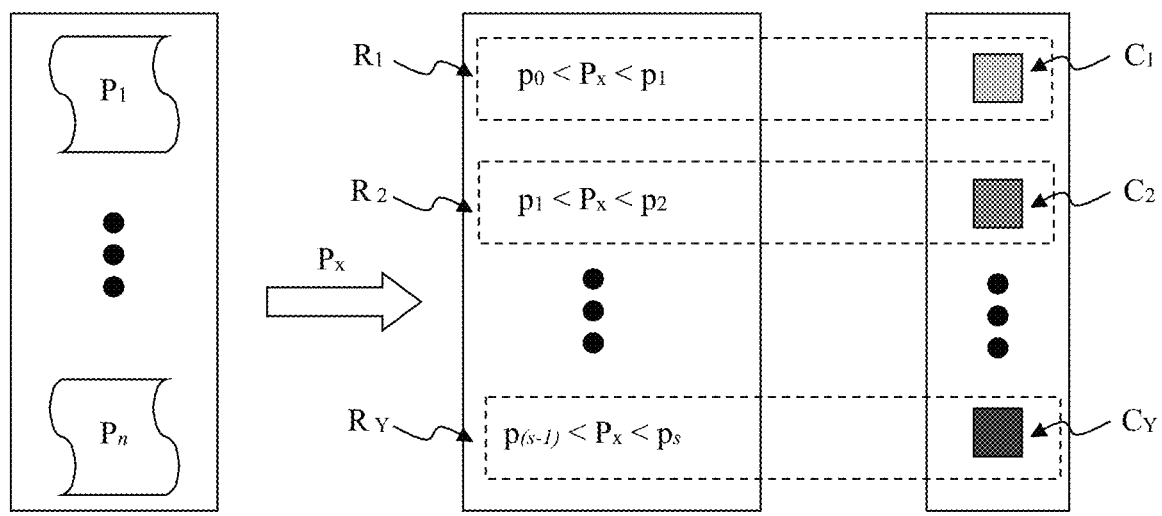
Figure 2D:
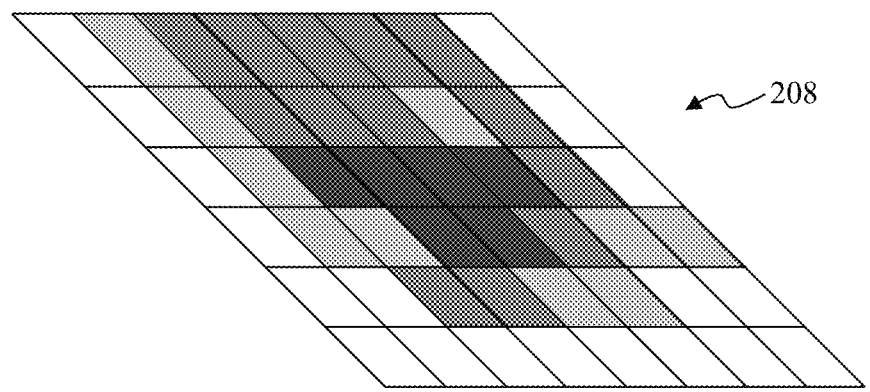

In the exemplary embodiments illustrated in FIG. 2C and FIG. 2D, the simulation application can thereafter map the power consumption of the electronic architectural design onto the electronic circuit design real estate map 204 to develop a power consumption map 208 to graphically illustrate the power consumptions $P_1$ through $P_n$. In some embodiments, the power consumption map 208 approximates the power consumption of the electronic architectural design being simulated by the simulation application over the corresponding instance of time. As illustrated in FIG. 2C, the power consumptions $P_1$ through $P_n$ can be within one or more ranges of power consumptions $R_1$ through $R_Y$ with each range of power consumptions from among the one or more ranges of power consumptions $R_1$ through $R_Y$ being associated with a different color from among colors $C_1$ through $C_Y$. In some embodiments, the colors $C_1$ through $C_Y$ can represent different shades of gray from the gray scale as illustrated in FIG. 2C. In other embodiments, the colors $C_1$ through $C_Y$ can represent any suitable color, such as red, orange, yellow, green, blue, indigo, and/or violet to provide some examples, or suitable combination colors that will be apparent to those skilled in the relevant art(s) without departing from the spirit and scope of the present disclosure, or any combination thereof.

In the exemplary embodiment illustrated in FIG. 2C, the simulation application can select a corresponding range of power consumptions from among the one or more ranges of power consumptions $R_1$ through $R_Y$ for each power consumption from among the power consumptions $P_1$ through $P_n$. For example, as illustrated in FIG. 2C, the range of power consumptions $R_1$ includes power consumptions between a power $p_0$ and a power $p_1$, the range of power consumptions $R_2$ includes power consumptions between the power $p_1$ and a power $p_2$, and the range of power consumptions $R_Y$ includes power consumptions between a power $p_{(s-1)}$ and a power $p_s$. In this example, simulation application can select the range of power consumptions $R_1$ for a power consumption $P_X$ from among the power consumptions $P_1$ through $P_n$ when the power consumption $P_X$ is between the power $p_0$ and the power $p_1$, the range of power consumptions $R_1$ for the power consumption $P_2$ when the power consumption $P_X$ is between the power $p_1$ and the power $p_2$, and/or the range of power consumptions $R_Y$ for the power consumption $P_X$ when the power consumption $P_X$ is between the power $p_{(s-1)}$ and the power $p_s$. In an exemplary embodiment, the power $p_0$ is less than and the power $p_s$ so that real estate partitions from among the real estate partitions 202.1 through 202.*n* having power consumptions $P_1$ through $P_n$ within the range of power consumptions $R_1$ can be characterized as consuming less power than real estate partitions from among the real estate partitions 202.1 through 202.*n* having power consumptions $P_1$ through $P_n$ within the range of power consumptions $R_Y$. After selecting the corresponding range of power consumptions for each power consumption from among the power consumptions $P_1$ through $P_n$, the simulation application can thereafter select an associated color from among the colors $C_1$ through $C_Y$ that is associated with the corresponding range of power consumptions. From the example above as illustrated in FIG. 2C, the simulation application can thereafter select the color $C_1$ that associated with the range of power consumptions $R_1$ when the simulation application selects the range of power consumptions $R_1$ for the power consumption $P_X$, the color $C_2$ that associated with the range of power consumptions $R_2$ when the simulation application selects the range of power consumptions $R_2$ for the power consumption $P_X$, and/or the color $C_Y$ that associated with the range of power consumptions $R_Y$ when the simulation application selects the range of power consumptions $R_Y$ for the power consumption $P_X$. Thereafter, the simulation application can thereafter color the real estate partitions 202.1 through 202.*n* on the electronic circuit design real estate map 204 within their associated colors $C_1$ through $C_Y$ to develop a power consumption map 208 at the corresponding instance in time as illustrated in FIG. 2D.

Figure 2E:
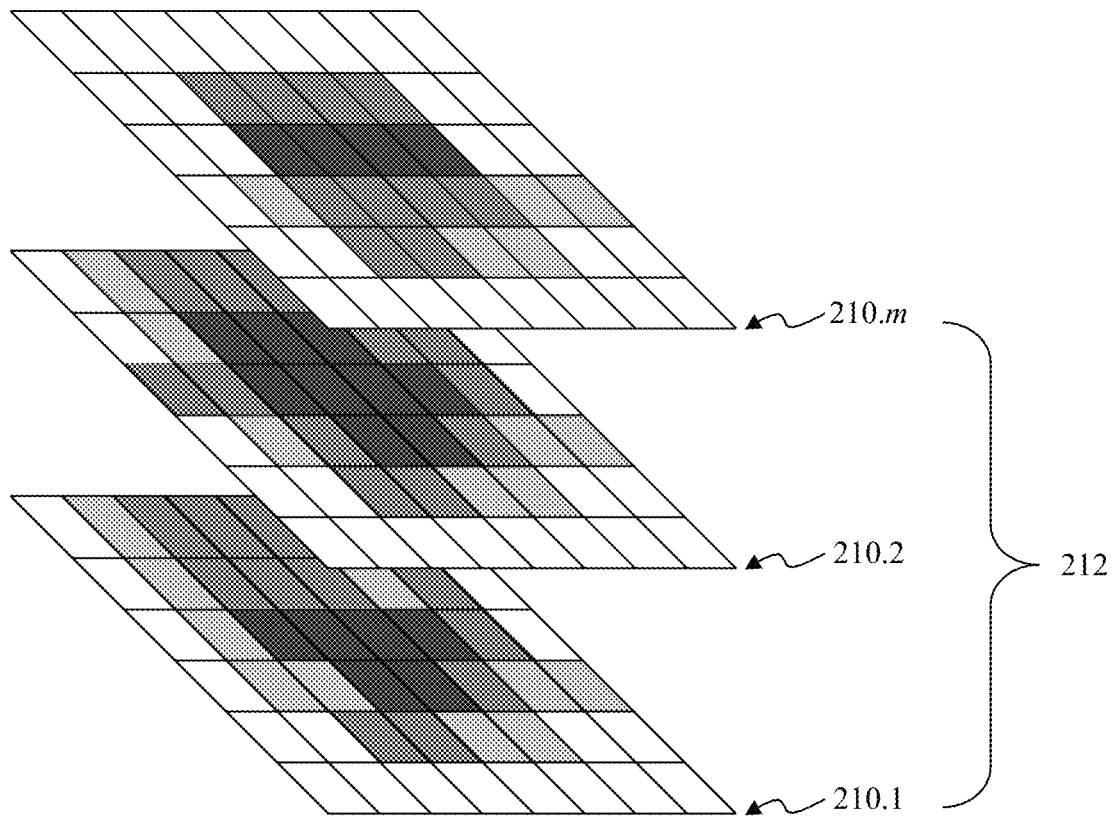

In some embodiments, the simulation application can develop multiple power consumption maps 210.1 through 210.*m* in a substantially similar manner as the power consumption map 208 to develop a comprehensive power consumption map 212 as illustrated in FIG. 2E. The simulation application can capture the electronic signals 206.1 through 206.*r* from the real estate partitions 202.1 through 202.*n* over multiple instances in time 1 through m. The multiple instances in time 1 through m can represent absolute instances in time, for example, once every millisecond (ms), and/or instances in time relative to the simulation of the electronic architectural design, for example, once every simulation cycle. After capturing the electronic signals 206.1 through 206.*r*, the simulation application can thereafter utilize the electronic signals 206.1 through 206.*r* to determine the power consumption of the real estate partitions 202.1 through 202.*n* over the multiple instances in time 1 through m. As illustrated in FIG. 2E, the simulation application can thereafter map the power consumption of the real estate partitions 202.1 through 202.*n* onto the electronic circuit design real estate map 204 at the multiple instances in time 1 through m to develop power consumption maps 210.1 through 210.*m* in a substantially similar manner as the power consumption map 208 to develop the comprehensive power consumption map 212 over the multiple instances in time 1 through m. In some embodiments, the comprehensive power consumption map 212 graphically illustrates the power consumptions $P_1$ through $P_n$ of the real estate partitions 202.1 through 202.*n* over the multiple instances in time 1 through m.

Exemplary Thermal Map

As described above in FIG. 1, a computer system, an exemplary embodiment of which is to be described in further detail below, executing the simulation application 106, can capture electronic signals within the electronic architectural design as the simulation application 106 is simulating the electronic architectural design for the electronic circuit design. The computer system can thereafter analyze the electronic signals to determine the power consumption of the electronic architectural design as described above in FIG. 2A through FIG. 2E. The computer system can further derive the one or more thermal maps based upon the power consumption of the electronic architectural design as to be described in further detail below in FIG. 3A through FIG. 3E.

FIG. 3A through FIG. 3E graphically illustrates exemplary thermal maps generated by the exemplary electronic design platform according to exemplary embodiments of the present disclosure. As described above, a computer system executing a simulation application, such as the simulation application 106 to provide an example, can simulate an electronic architectural design for an electronic circuit design to replicate one or more characteristics, parameters, or attributes of the electronic architectural design. As part of this simulation, the simulation application can capture electronic signals within the electronic architectural design over time and can thereafter analyze these electronic signals to determine the power consumption of the electronic architectural design over time. As to described in further detail below, the simulation application can further derive one or more thermal maps based upon the power consumption of the electronic architectural design over time As described above in FIG. 2A through FIG. 2E, the simulation application can virtually partition the electronic architectural design into real estate partitions, such as the real estate partitions 202.1 through 202.*n* to provide an example. Generally, the temperature at one of these real estate partitions can be expressed as:

$$\text{cumulative\_temp}_{PART}(t) = \text{temp}_{PART}(t) + \text{temp}_{PART}(t-1) + \text{temp}_{ADJ\_PART}(t) \quad (1)$$

where cumulative_temp$_{PART}$(t) represents the cumulative temperature of this real estate partition at a corresponding instance in time, temp$_{PART}$(t) represents the temperature of this real estate partition which has been derived from the power consumption of this real estate partition at the corresponding instance in time, temp$_{PART}$(t-1) is indicative of the temperature of this real estate partition at one or more previous instances in time, and temp$_{ADJ\_PART}$(t) is indicative of temperature of adjacent real estate partitions from among the real estate partitions at one or more previous instances in time. Each of these terms of Equation (1) is to be further described below in FIG. 3A and FIG. 3B.

Figure 3A:
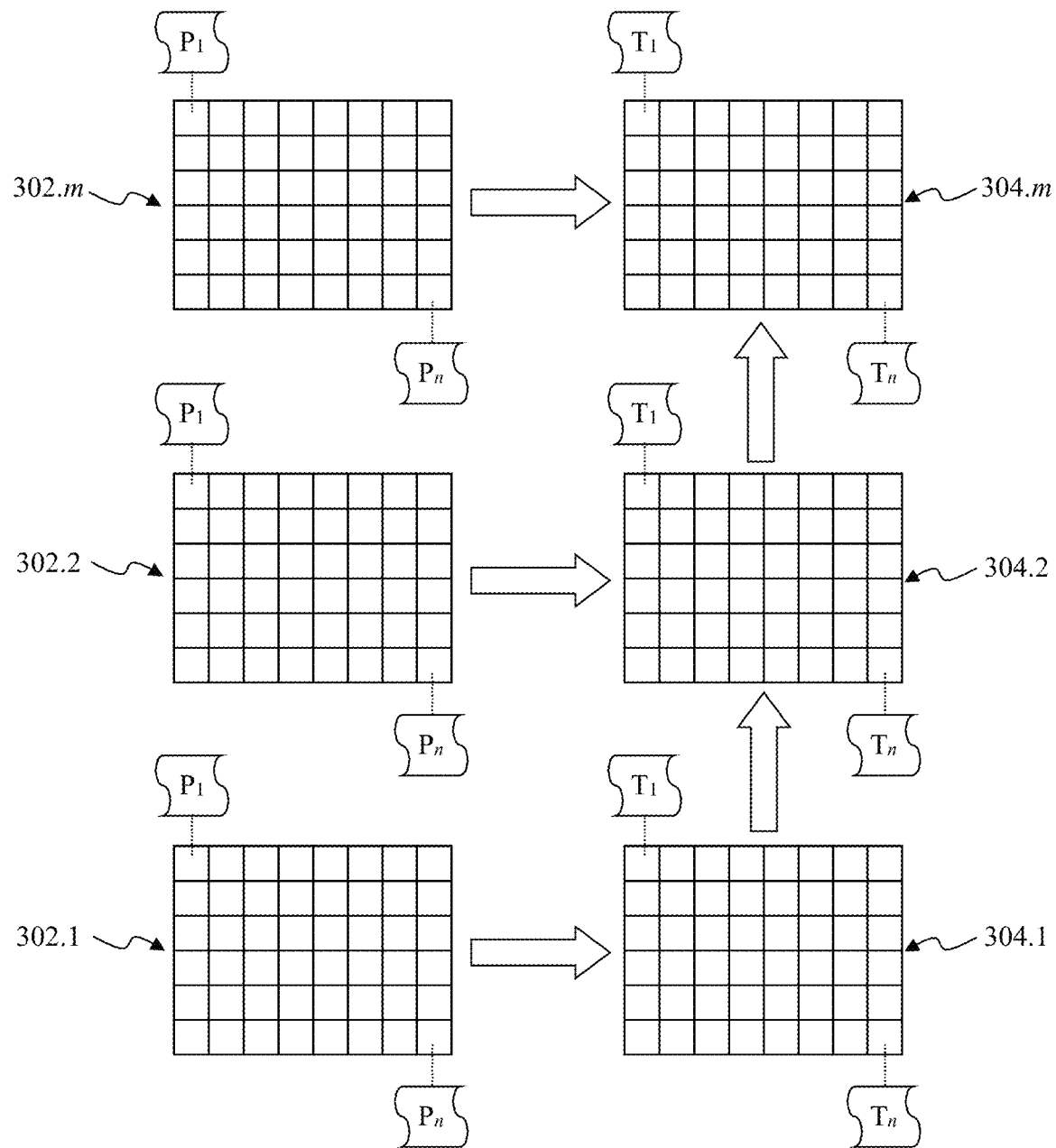
FIG. 3A through FIG. 3E graphically illustrates exemplary thermal maps generated by the exemplary electronic design platform according to exemplary embodiments of the present disclosure.

In the exemplary embodiment illustrated in FIG. 3A, the simulation application can derive one or more temperatures for the real estate partitions over time based upon the power consumptions of the real estate partitions, such as the power consumptions $P_1$ through $P_n$ as described above in FIG. 2A through 2E. In some embodiments, the simulation application can utilize one or more power consumption maps, such as the multiple power consumption maps 210.1 through 210.*m* to provide an example, to derive the one or more temperatures for the real estate partitions. As illustrated in FIG. 3A, the simulation application can utilize power consumption maps 302.1 through 302.*m* to derive the one or temperatures for the real estate partitions to develop thermal maps 304.1 through 304.*m* of a comprehensive thermal map 306 over time. The simulation application can determine power consumptions $P_1$ through $P_n$ for the real estate partitions over the multiple instances in time 1 through m to develop power consumption maps 302.1 through 302.*m* in a substantially similar manner as described above in FIG. 2A through FIG. 2E. The simulation application can thereafter convert the power consumptions $P_1$ through $P_n$ from the power consumption maps 302.1 through 302.*m* to determine temperatures $T_1$ through $T_n$ for the real estate partitions over the multiple instances in time 1 through m to develop thermal maps 304.1 through 304.*m*. In some embodiments, the simulation application can convert the power consumptions $P_1$ through $P_n$ expressed in Watts to joules (J) to calculate heat dissipations of the real estate partitions. In these embodiments, the simulation application can thereafter utilize the thermal properties of the analog components and/or the digital components, such as, the specific heat capacities of the analog components and/or the digital components within the real estate partitions as determined, for example, by their manufacturer, to covert the heat dissipation of the real estate partitions into the temperatures $T_1$ through $T_n$ over the multiple instances in time 1 through m. In some embodiments, the simulation application can utilize a look-up table to convert the power consumptions $P_1$ through $P_n$ for the real estate partitions into the temperatures $T_1$ through $T_n$ for the real estate partitions.

Moreover, in the exemplary embodiment illustrated in FIG. 3A, the simulation application can include the temperatures $T_1$ through $T_n$ of previous thermal maps 304.1 through 304.m over previous instances in time in deriving the temperatures $T_1$ through $T_n$ for the real estate partitions over the multiple instances in time 1 through m. In some embodiments, the temperatures $T_1$ through $T_n$ of previous thermal maps 304.1 through 304.m can be combined with the temperatures $T_1$ through $T_n$ for the real estate partitions over the multiple instances in time 1 through m. For example, as illustrated in FIG. 3A, the temperatures $T_1$ through $T_n$ of the thermal map 304.1 can be combined with the temperatures $T_1$ through $T_n$ of the thermal map 304.2. In some embodiments, the simulation application can be appropriately scale, for example, time-decay, the temperatures $T_1$ through $T_n$ of previous thermal maps 304.1 through 304.m over the previous instances in time based upon measures of heat transfer of the analog components and/or the digital components within the real estate partitions as determined, for example, by their manufacturer as well as other environmental characteristics and/or other heat dissipation characteristics of the analog components and/or the digital components within the real estate partitions that will be apparent to those skilled in the relevant art(s) without departing from the spirit and scope of the present disclosure.

Figure 3B:
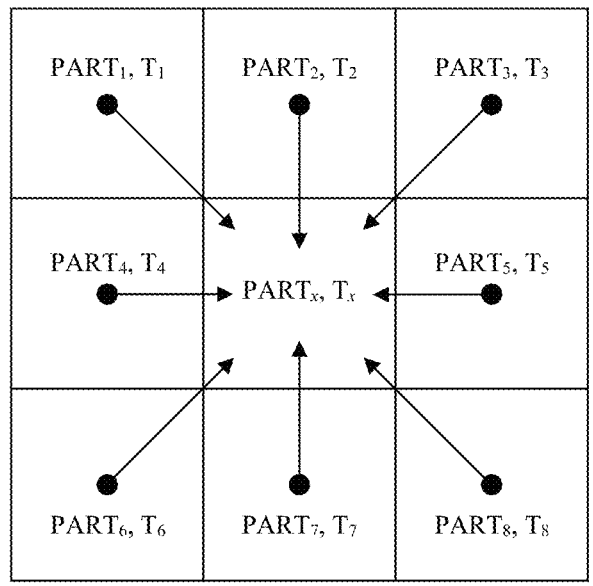

In some embodiments, for example, as illustrated in FIG. 3B, the simulation application can include the temperatures $T_1$ through $T_n$ of adjacent real estate partitions over the multiple instances in time 1 through m in developing the temperatures $T_1$ through $T_n$ for the real estate partitions over the multiple instances in time 1 through m. In the exemplary embodiment illustrated in FIG. 3B, the simulation application can include one or more the temperatures $T_1$ through $T_8$ of adjacent real estate partitions $PART_1$ through PART8 from among the real estate partitions in deriving a temperature $T_x$ for a real estate partition $PART_x$ from among the real estate partitions. In some embodiments, the simulation application can be appropriately scale, for example, thermal heat loss over distance, the temperatures $T_1$ through $T_n$ of the adjacent real estate partitions over the multiple instances in time 1 through m based upon the measures of heat transfer of the analog components and/or the digital components within the real estate partitions as well as the other environmental characteristics and/or the other heat dissipation characteristics of the measures of heat transfer of the analog components and/or the digital components within the real estate partitions that will be apparent to those skilled in the relevant art(s) without departing from the spirit and scope of the present disclosure. In some embodiments, the measure of heat transfer can be based upon temperature differences between the real estate partitions, physical distances between the real estate partitions, and/or other thermal characteristics of the analog components and/or the digital components within the real estate partitions, such as cooling fans and/or heat sinks present within the real estate partitions to provide an example, that will be apparent to those skilled in the relevant art(s) without departing from the spirit and scope of the present disclosure.

Figure 3C:
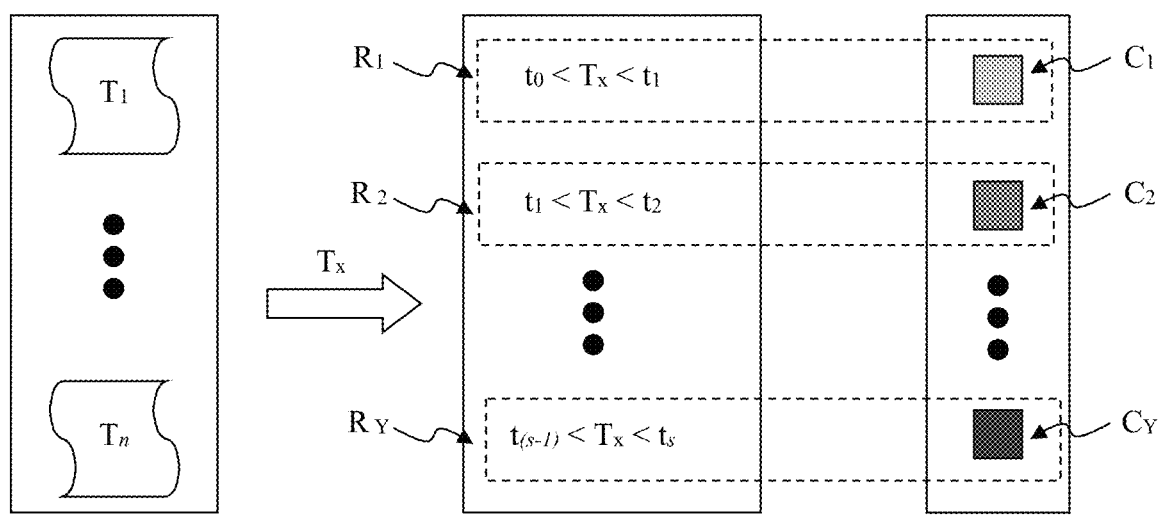
Figure 3D:
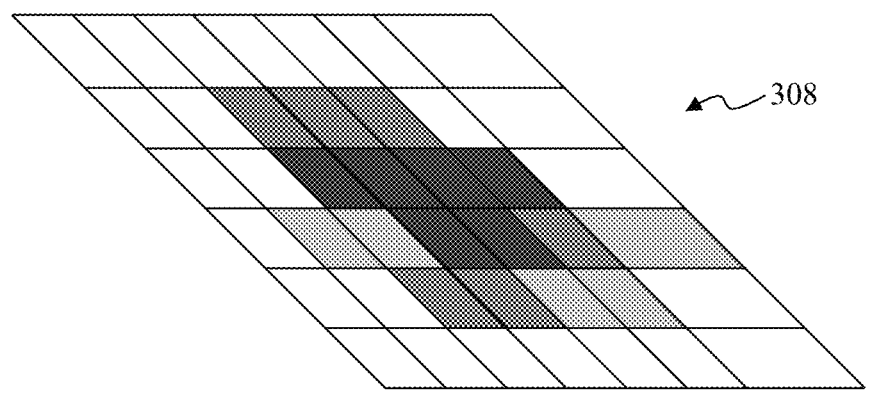

In the exemplary embodiments illustrated in FIG. 3C and FIG. 3D, the simulation application can thereafter map the analog components and/or the digital components within the real estate partitions onto an electronic circuit design real estate map 204, such as the electronic circuit design real estate map 204 as described above in FIG. 2A through FIG. 2E to develop a thermal map 308 to graphically illustrate the temperatures $T_1$ through $T_n$. In some embodiments, the thermal map 308 approximates the temperature of the electronic architectural design being simulated over time by the simulation application over a corresponding instance of time. As illustrated in FIG. 3C, the temperatures $T_1$ through $T_n$ can be within one or more ranges of temperatures $R_1$ through $R_Y$ with each range of temperatures from among the one or more ranges of temperatures $R_1$ through $R_Y$ being associated with a different color from among colors $C_1$ through $C_Y$. In some embodiments, the colors $C_1$ through $C_Y$ can represent different shades of gray from the gray scale as illustrated in FIG. 3C. In other embodiments, the colors $C_1$ through $C_Y$ can represent one or more of red, orange, yellow, green, blue, indigo, and/or violet.

In the exemplary embodiment illustrated in FIG. 3C, the simulation application can select a corresponding range of temperatures from among the one or more ranges of temperatures $R_1$ through $R_Y$ for each temperature from among the temperatures $T_1$ through $T_n$. For example, as illustrated in FIG. 3C, the range of temperatures $R_1$ includes temperatures between a temperature $t_0$ and a temperature $t_1$, the range of temperatures $R_3$ includes temperatures between the temperature $t_1$ and a temperature $t_3$, and the range of temperatures $R_Y$ includes temperatures between a temperature $t_{(s-1)}$ and a temperature $t_s$. In this example, simulation application can select the range of temperatures $R_1$ for a temperature $T_X$ from among the temperatures $T_1$ through $T_n$ when the temperature $T_X$ is between the temperature $t_0$ and the temperature $t_1$, the range of temperatures $R_1$ for the temperature $T_3$ when the temperature $T_X$ is between the temperature $t_1$ and the temperature $t_3$, and/or the range of temperatures $R_Y$ for the temperature $T_X$ when the temperature $T_X$ is between the temperature $t_{(s-1)}$ and the temperature $t_s$. In an exemplary embodiment, the temperature $t_0$ is less than and the temperature $t_s$ so that real estate partitions from among the real estate partitions having temperatures $T_1$ through $T_n$ within the range of temperatures $R_1$ can be characterized as operating at lower temperatures than real estate partitions from among the real estate partitions 202.1 through 202.n having temperatures $T_1$ through $T_n$ within the range of temperatures $R_Y$. After selecting the corresponding range of temperatures for each temperature from among the temperatures $T_1$ through $T_n$, the simulation application can thereafter select an associated color from among the colors $C_1$ through $C_Y$ that is associated with the corresponding range of temperatures. From the example above as illustrated in FIG. 3C, the simulation application can thereafter select the color $C_1$ that associated with the range of temperatures $R_1$ when the simulation application selects the range of temperatures $R_1$ for the temperature $T_X$, the color $C_3$ that associated with the range of temperatures $R_3$ when the simulation application selects the range of temperatures $R_3$ for the temperature $T_X$, and/or the color $C_Y$ that associated with the range of temperatures $R_Y$ when the simulation application selects the range of temperatures $R_Y$ for the temperature $T_X$. Thereafter, the simulation application can thereafter color the real estate partitions on the hardware simulation application map 304 within their associated colors $C_1$ through $C_Y$ to develop the thermal map 308 at the corresponding instance in time as illustrated in FIG. 3D.

Figure 3E:
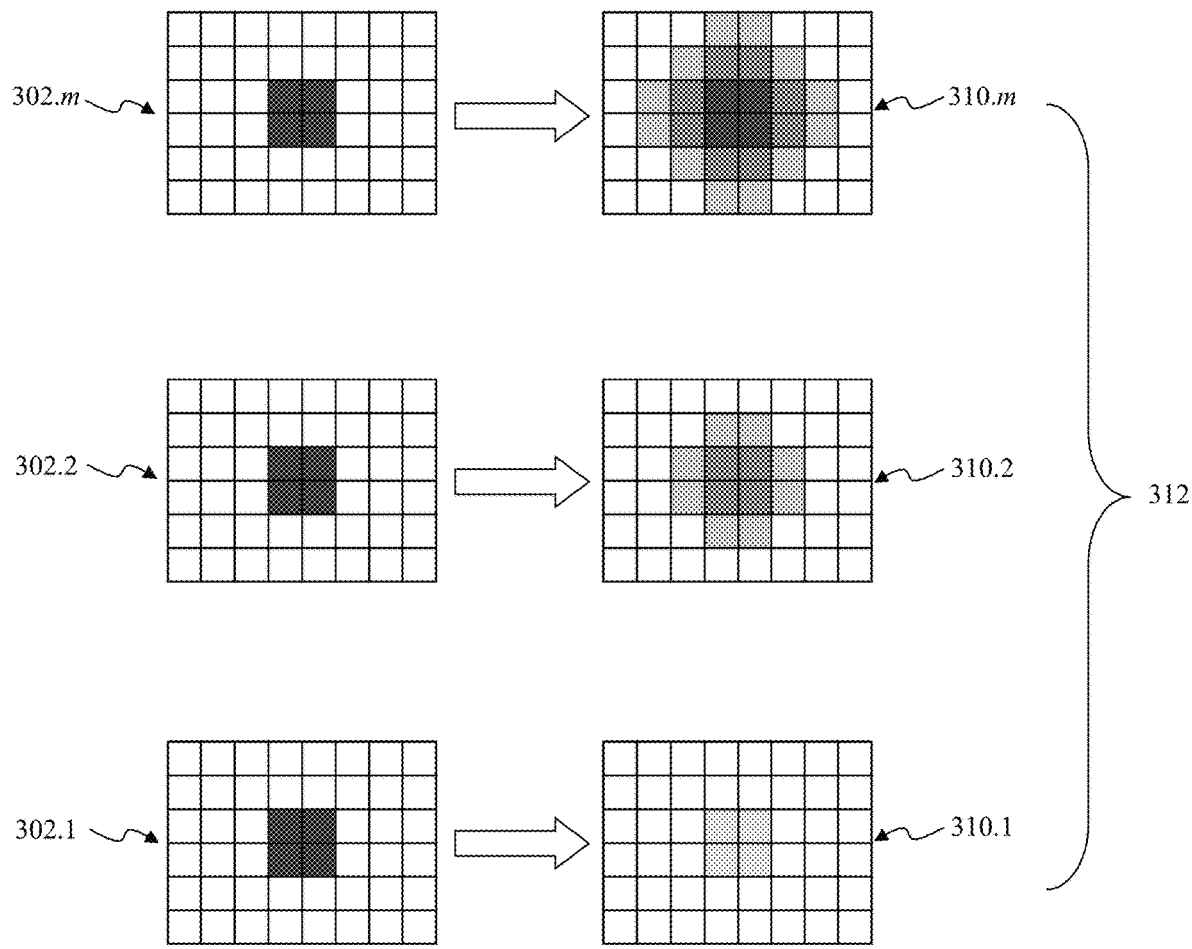

In some embodiments, the simulation application can develop multiple thermal maps 310.1 through 310.m in a substantially similar manner as the thermal map 308 to develop a comprehensive temperature map 312 as illustrated in FIG. 3E. The simulation application can capture the electronic signals, such as the electronic signals 206.1 through 206.r as described above in FIG. 2A through 2E, from the real estate partitions over multiple instances in time 1 through m. After capturing the electronic signals, the simulation application can thereafter utilize the electronic signals to determine the power consumption of the real estate partitions over the multiple instances in time 1 through m as described above in FIG. 2A through FIG. 2E. After determining the power consumption of the real estate partitions can thereafter utilize the power consumption to determine the temperature of the real estate partitions over the multiple instances in time 1 through m. As illustrated in FIG. 3E, the simulation application can thereafter map the temperatures of the real estate partitions onto the electronic circuit design real estate map to develop thermal maps 310.1 through 310.m in a substantially similar manner as the thermal map 308 to develop a comprehensive temperature map 312 over the multiple instances in time 1 through m. In some embodiments, the comprehensive temperature map 312 graphically illustrates the temperatures of the real estate partitions 202.1 through 202.n being simulated by the simulation application over the multiple instances in time 1 through m.

Exemplary Operation of the Exemplary Simulation Application

Figure 4:
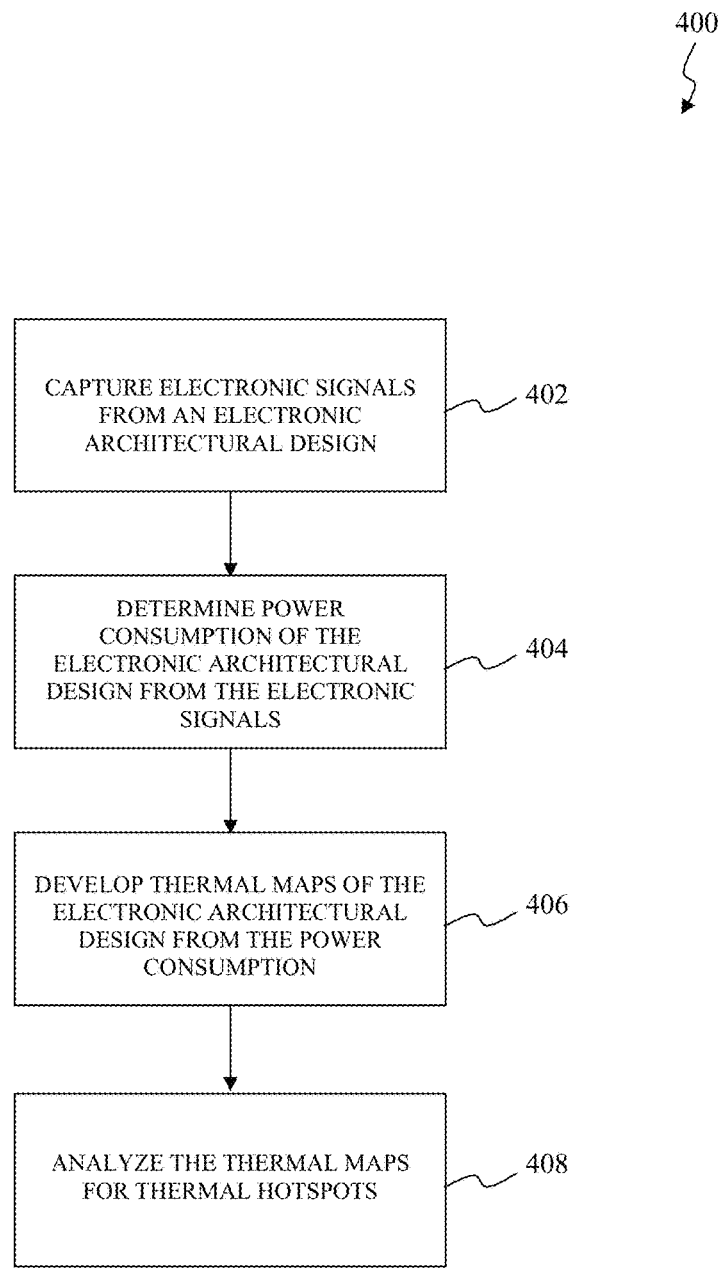
FIG. 4 illustrates a flowchart of exemplary operations for the electronic design platform according to exemplary embodiments of the present disclosure.

FIG. 4 illustrates a flowchart of exemplary operations for the electronic design platform according to exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 400 for developing power consumption maps describing the power consumption of an electronic architectural design, or a portion thereof while the electronic architectural design is being simulated. Alternatively, or in addition to, the exemplary operational control flow 400 can derive thermal maps describing the temperature of the electronic architectural design or the portion thereof from the power consumption maps. In the exemplary embodiment illustrated in FIG. 4, the operational control flow 400 can be performed by a computer system, executing a simulation application, such as the simulation application 106 as described above in FIG. 1.

At operation 402, the operational control flow 400 captures electronic signals from the electronic architectural design, or the portion thereof, as the simulation application is simulating the electronic architectural design, or the portion thereof. The operational control flow 400 can capture the electronic signals from real estate partitions of the electronic architectural design, or the portion thereof, as described above in FIG. 1 and FIG. 2A through FIG. 2E.

At operation 404, the operational control flow 400 analyzes the electronic signals from operation 402 to determine power consumption, such as the power consumptions $P_1$ through $P_n$ as described above in FIG. 2A through FIG. 2E, of the electronic architectural design, or the portion thereof. The operational control flow 400 can determine the power consumption of the real estate partitions of the electronic architectural design as described above in FIG. 2A through FIG. 2E. In some embodiments, the operational control flow 400 can map the power consumption of the real estate partitions onto an electronic circuit design real estate map, such as the electronic circuit design real estate map 204 to provide an example, to develop the power consumption maps to graphically illustrate the power consumption of the real estate partitions over time.

At operation 406, the operational control flow 400 utilizes the power consumption of the electronic architectural design, or the portion thereof, from operation 404 to develop the thermal maps. The operational control flow 400 can derive temperatures, such as the temperatures $T_1$ through $T_n$ as described above in FIG. 3A through 3E, for the real estate partitions from the power consumption of the electronic architectural design, or the portion thereof, from operation 404. Thereafter, the operational control flow 400 can map the temperatures of the real estate partitions onto the electronic circuit design real estate map to develop the thermal maps to graphically illustrate the temperature of the real estate partitions over time.

At operation 408, the operational control flow 400 can analyze the thermal maps from operation 406 to detect three-dimensional thermal hotspots, also referred to as thermal heat-balls, within the thermal maps from operation 406. This detection of the three-dimensional thermal hotspots within the thermal maps is further described below in FIG. 5A through FIG. 5C.

Detection of Three-Dimensional Thermal Hotspots

Figure 5A:
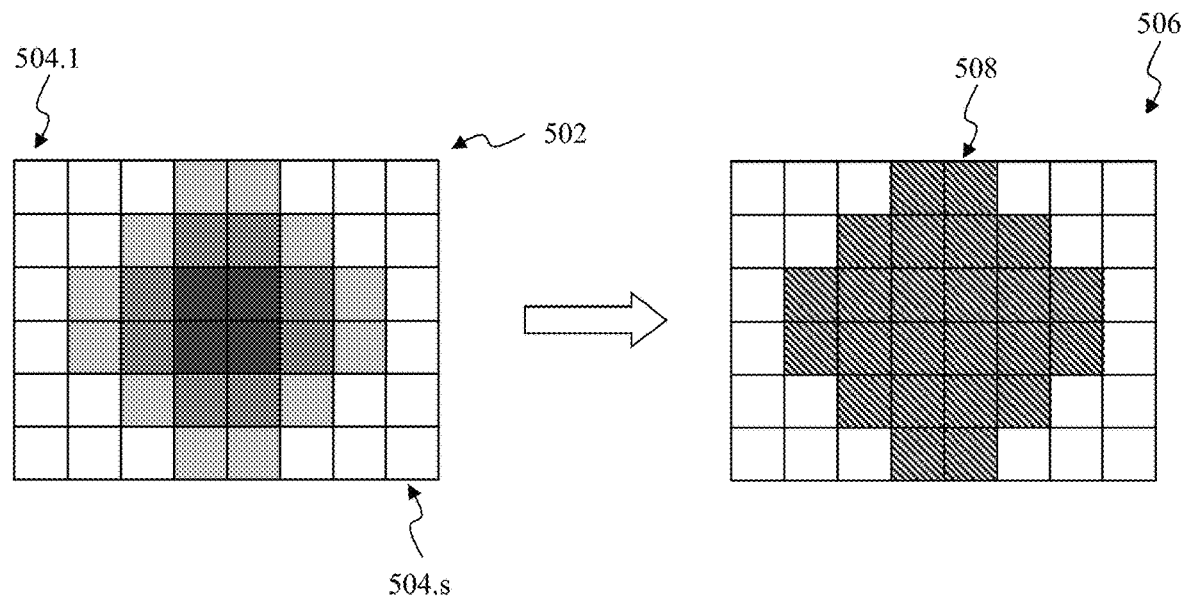
FIG. 5A through FIG. 5C graphically illustrate exemplary detection of three-dimensional thermal hotspots by the exemplary electronic design platform according to exemplary embodiments of the present disclosure.
Figure 5B:
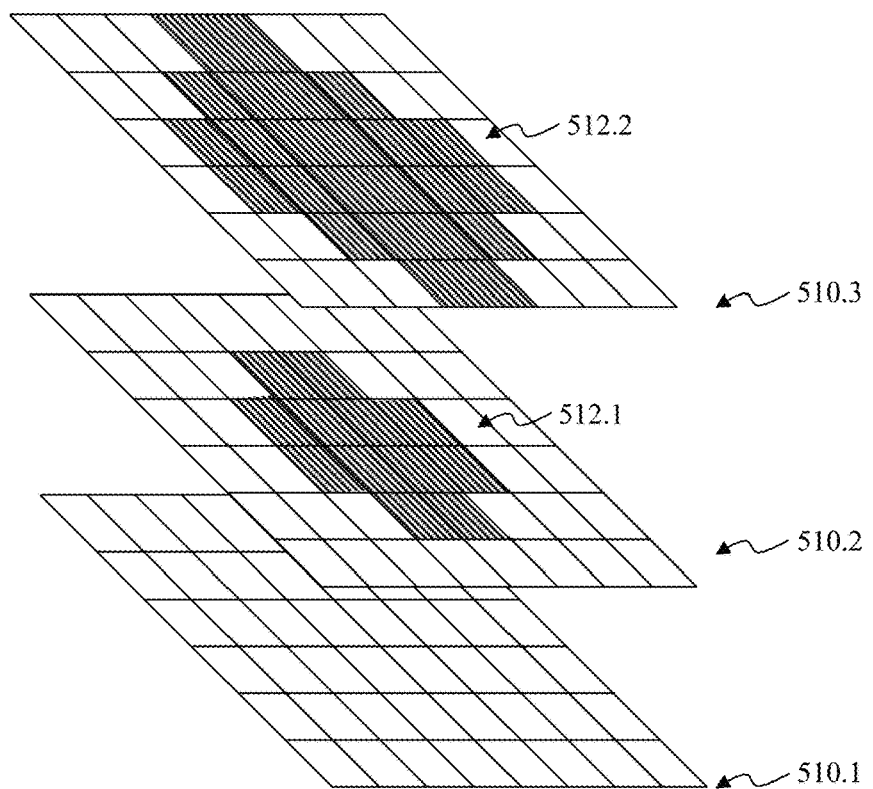
Figure 5C:
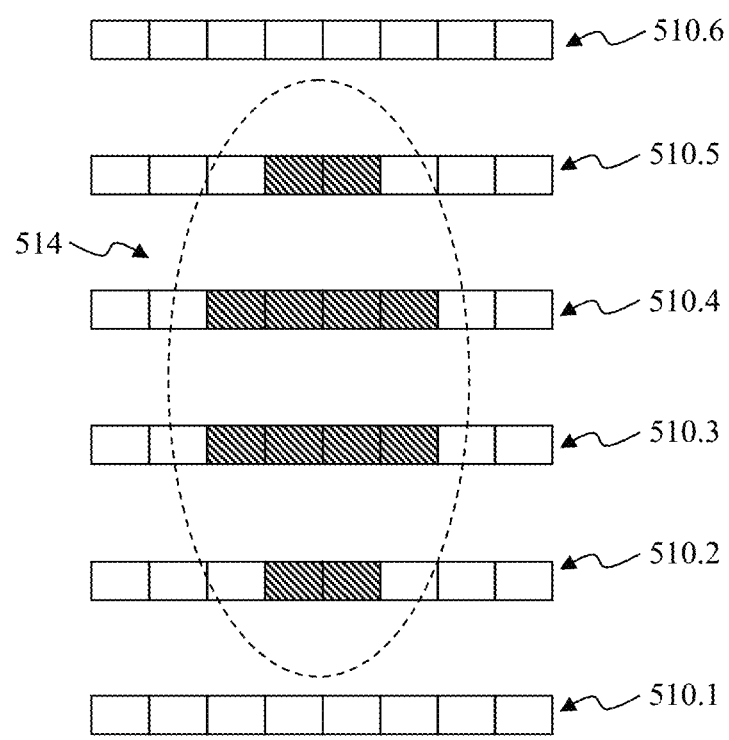

FIG. 5A through FIG. 5C graphically illustrate exemplary detection of three-dimensional thermal hotspots by the exemplary electronic design platform according to exemplary embodiments of the present disclosure. As described above, a computer system executing a simulation application, such as the simulation application 106 to provide an example, can simulate an electronic architectural design for an electronic circuit design to replicate one or more characteristics, parameters, or attributes of the electronic architectural design. As part of this simulation, the simulation application can capture electronic signals within the electronic architectural design over time and can thereafter analyze these electronic signals to determine the power consumption of the electronic architectural design over time as described above in FIG. 2A through FIG. 2E. The simulation application can further derive one or more thermal maps based upon the power consumption of the electronic architectural design over time as described above in FIG. 3A through FIG. 3E. As to be described in further detail below, the simulation application can further analyze the one or more thermal maps to detect three-dimensional thermal hotspots, also referred to as thermal heat-balls, within the thermal maps.

In the exemplary embodiment illustrated in FIG. 5A, the simulation application analyzes the thermal maps to identify one or more two-dimensional hot real estate partitions from among the real estate partitions whose temperature exceeds one or more temperature thresholds. In some embodiments, the one or more temperature thresholds include with upper limits generally set at 70° C. for commercial applications, 85° C. for industrial applications, and 125° C. for military applications to provide some examples. As illustrated in FIG. 5A, the simulation application analyzes a thermal map 502 to identify one or more real estate partitions from among real estate partitions 504.1 through 504.s whose temperature exceeds the one or more temperature thresholds. The thermal map 502 can represent an exemplary embodiment of one of the thermal maps 310.1 through 310.m as described above in FIG. 3A through 3E. As an example, in the exemplary embodiment illustrated in FIG. 5A, those real estate partitions from among real estate partitions 504.1 through 504.s that are colored medium gray and dark gray represent two-dimensional hot real estate partitions whose temperature exceeds the one or more temperature thresholds.

After identifying the one or more two-dimensional hot real estate partitions, the simulation application thereafter groups the one or more two-dimensional hot real estate partitions with real estate partitions from among the real estate partitions whose temperature does not exceed the one or more temperature thresholds to develop one or more two-dimensional hot partition maps. As an example, in the exemplary embodiment illustrated in FIG. 5A, those real estate partitions from among real estate partitions 504.1 through 504.s that are colored light gray and white represent real estate partitions from among real estate partitions 504.1 through 504.s whose temperature does not exceed the one or more temperature thresholds. In this example, the simulation application thereafter groups the one or more two-dimensional hot real estate partitions colored medium gray and dark gray in FIG. 5A with neighboring, or adjacent, real estate partitions colored light gray in FIG. 5A to develop a hot partition map 506 having a two-dimensional hot partition 508. In the exemplary embodiment illustrated in FIG. 5A, the two-dimensional hot partition 508 is illustrated using hashed shading.

The simulation application thereafter analyzes neighboring thermal maps from among the thermal maps which are neighboring, or adjacent, to the analyzed thermal map which similarly include one or more two-dimensional hot partitions to detect the one or more three-dimensional thermal heat-balls. The simulation application detects the one or more three-dimensional thermal heat-balls within the thermal maps when the one or more two-dimensional hot partitions of the analyzed one or more thermal maps overlap the one or more two-dimensional hot partitions of the neighboring thermal maps by a thermal overlap percentage, for example, fifty (50) percent. As an example, in the exemplary embodiment illustrated in FIG. 5B, the simulation application can analyze a thermal map 510.2 from among thermal maps 510.1 through 510.3 to develop a two-dimensional hot partition 512.1 as described above. The thermal maps 510.1 through 510.3 can represent an exemplary embodiment of some of the thermal maps 310.1 through 310.m as described above in FIG. 3A through 3E. In this example, the simulation application thereafter analyzes a neighboring thermal map 510.3 from among the thermal maps thermal maps 510.1 and 510.3 which is neighboring, or adjacent, to the thermal map 510.2 which similarly includes a two-dimensional hot partition 512.2. In this example, the simulation application detects a three-dimensional thermal heat-ball within the thermal maps 510.1 through 510.3 since the two-dimensional hot partition 512.1 overlaps the two-dimensional hot partition 512.2 by the thermal overlap percentage.

After detecting the one or more three-dimensional thermal heat-balls, the simulation application can continue to analyze neighboring thermal maps from among the thermal maps which are neighboring, or adjacent, to the analyzed thermal maps which similarly include one or more two-dimensional hot partitions to detect the extent of the detected one or more three-dimensional thermal heat-balls. From the example above, in the exemplary embodiment illustrated in FIG. 5C, the simulation application can continue to analyze the thermal maps 510.4 through 510.6 to detect the extent of a three-dimensional thermal heat-ball 514. As illustrated in FIG. 5C, the three-dimensional thermal heat-ball 514 extends from the thermal maps 510.2 to the thermal map 510.5.

In some embodiments, the simulation application can thereafter quantify the one or more three-dimensional thermal heat-balls by their volumes, namely, the total number of two-dimensional hot partitions included within the one or more three-dimensional thermal heat-balls, their intensities, for example, the average temperature of the one or more two-dimensional hot real estate partitions within the one or more three-dimensional thermal heat-balls, their locations, namely their locations within the thermal maps, and/or their durations, namely, accumulation of time of thermal maps included within the one or more three-dimensional thermal heat-balls. In some embodiments, the simulation application can rank-order the three-dimensional thermal hotspots detected within the thermal maps from operation 406 in accordance with their volume, their intensity, and/or their location. In some embodiments, the simulation application can effectively zoom into the three-dimensional thermal hotspots from operation 406 by re-partitioning those real estate partitions having the three-dimensional thermal hotspots into smaller real estate partitions in a substantially similar manner as described above in FIG. 2A through FIG. 2E and repeating operation 402 through 406 to determine one or more new thermal maps for these smaller real estate partitions. In some embodiments, the simulation application can utilize the power consumption maps from operation 404 and/or the thermal maps from operation 406 to adjust the placement of the analog components and/or digital components onto the electronic circuit design real estate as described above in FIG. 1 to lessen, for example, minimize, the one or more three-dimensional thermal heat-balls.

Exemplary Computer System for Implementing the Exemplary Simulation Application

Figure 6:
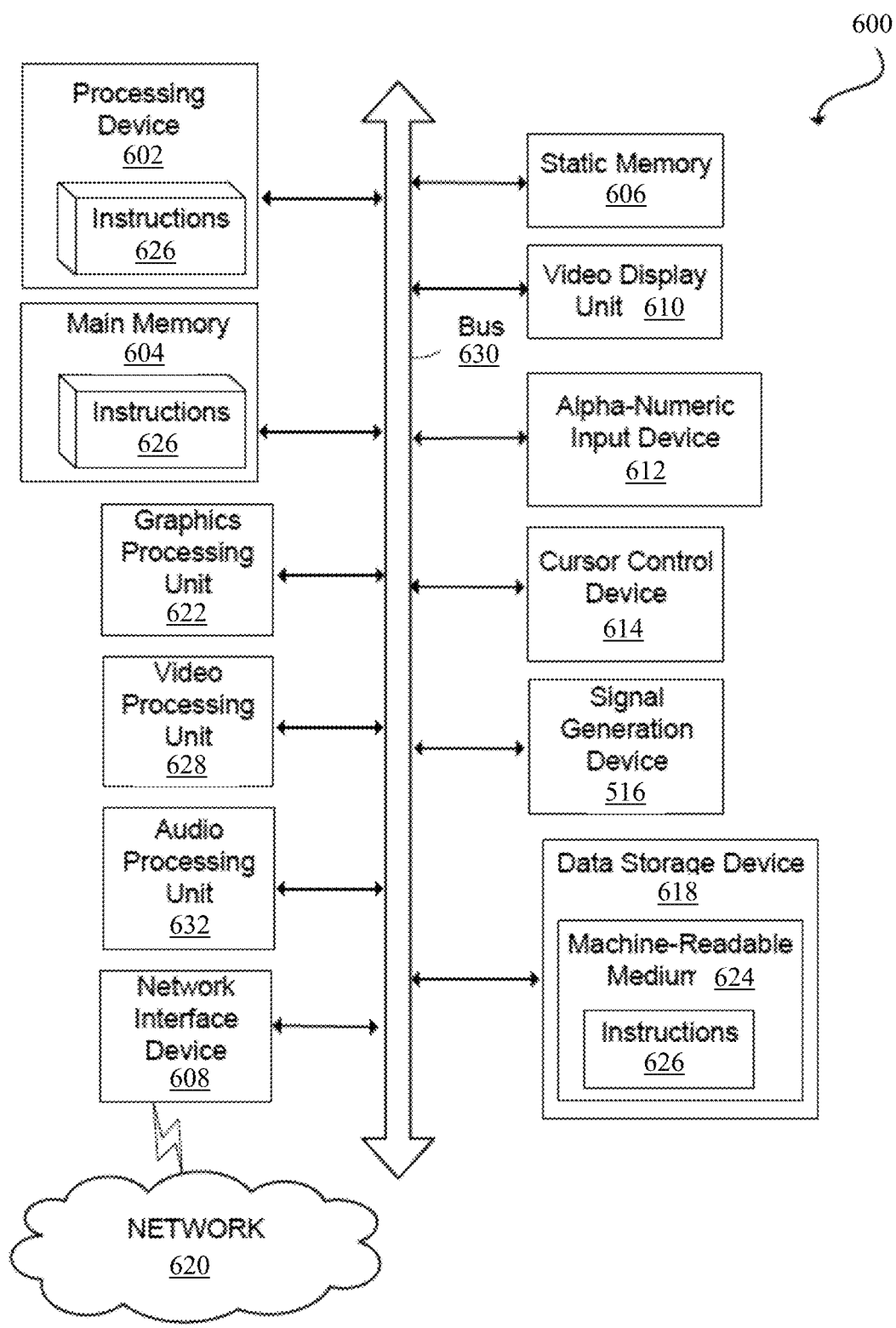
FIG. 6 illustrates a block diagram of an exemplary computer system for implementing the electronic design platform according to exemplary embodiments of the present disclosure.

FIG. 6 illustrates a block diagram of an exemplary computer system for implementing the electronic design platform according to exemplary embodiments of the present disclosure. The discussion of FIG. 6 to follow is to describe a computer system 600 which can be configured to execute the synthesis application 102, the placing and routing application 104, the simulation application 106 as described above in FIG. 1, or any combination thereof. In alternative implementations, the computer system may be connected (e.g., networked) to other computer systems that execute the synthesis application 102, the placing and routing application 104, the simulation application 106 as described above in FIG. 1, or any combination thereof in a LAN, an intranet, an extranet, and/or the Internet. The computer system may operate in the capacity of a server or a client computer system in client-server network environment, as a peer computer system in a peer-to-peer (or distributed) network environment, or as a server or a client computer system in a cloud computing infrastructure or environment.

The computer system may be a personal computer (PC), a tablet PC, a set-top box (STB), a Personal Digital Assistant (PDA), a cellular telephone, a web appliance, a server, a network router, a switch or bridge, or any computer system capable of executing a set of instructions (sequential or otherwise) that specify actions to be taken by that computer system. Further, while a single computer system is illustrated, the term "computer system" shall also be taken to include any collection of computer systems that individually or jointly execute a set (or multiple sets) of instructions to perform any one or more of the methodologies discussed herein.

In the exemplary embodiment illustrated in FIG. 6, the computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

The processing device 602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 may be configured to execute instructions 626 for performing the operations and steps described herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a computer system-readable storage medium 624 (also known as a non-transitory computer-readable medium) on which is stored one or more sets of instructions 626 or software embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting computer system-readable storage media.

In some implementations, the instructions 626 include instructions to implement functionality corresponding to the present disclosure. While the computer system-readable storage medium 624 is shown in an example implementation to be a single medium, the term "computer system-readable storage medium" should be taken to include a single medium or multiple media (e.g., a centralized or distributed database, and/or associated caches and servers) that store the one or more sets of instructions. The term "computer system-readable storage medium" shall also be taken to include any medium that is capable of storing or encoding a set of instructions for execution by the computer system and that cause the computer system and the processing device 602 to perform any one or more of the methodologies of the present disclosure. The term "computer system-readable storage medium" shall accordingly be taken to include, but not be limited to, solid-state memories, optical media, and magnetic media.

CONCLUSION

Some portions of the preceding detailed descriptions have been presented in relation to algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a computer system-readable medium having stored thereon instructions, which may be used to program a computer system (or other electronic devices) to perform a process according to the present disclosure. A computer system-readable medium includes any mechanism for storing information in a form readable by a computer system (e.g., a computer). For example, a computer system-readable (e.g., computer-readable) medium includes a computer system (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A system for developing a plurality of thermal maps for an electronic architectural design, the system comprising:
   a memory that stores a simulation application; and
   a processor configured to execute the simulation application, the simulation application, when executed by the processor, configuring the processor to:
      simulate the electronic architectural design over a plurality of instances in time,
      capture a plurality of electronic signals from the electronic architectural design as the electronic architectural design is being simulated over the plurality of instances in time,
      determine a plurality of power consumptions of the electronic architectural design over the plurality of instances in time from the plurality of electronic signals,
      derive a plurality of cumulative temperatures for a plurality of real estate partitions of the electronic architectural design over the plurality of instances in time from the plurality of power consumptions,
      map the plurality of cumulative temperatures onto an electronic circuit design real estate of the electronic architectural design to develop the plurality of thermal maps over the plurality of instances in time, and
      determine a plurality of hot partition maps from the plurality of thermal maps wherein the plurality of hot partition maps are indicative of one or more real estate partitions of the plurality of real estate partitions exceeding a temperature threshold.

2. The system of claim 1, wherein the simulation application, when executed by the processor, configures the processor to:
   virtually partition the electronic circuit design real estate into the plurality of real estate partitions to develop an electronic circuit design real estate map,
   determine a plurality of power consumptions of the plurality of real estate partitions over the plurality of instances in time from the plurality of electronic signals, and
   color the plurality of real estate partitions over the plurality of instances in time with corresponding colors selected from among a plurality of colors associated with the plurality of power consumptions to develop a plurality of power consumption maps over the plurality of instances in time.

3. The system of claim 2, wherein the plurality of colors is associated with a plurality of ranges of power consumptions, and
   wherein the simulation application, when executed by the processor, configures the processor to:
      select corresponding ranges of power consumptions from among the plurality of ranges of power consumptions for the plurality of power consumptions, and
      select the corresponding colors associated with the corresponding ranges.

4. The system of claim 1, wherein the simulation application, when executed by the processor, configures the processor to:
   virtually partition the electronic circuit design real estate into the plurality of real estate partitions to develop an electronic circuit design real estate map,
   determine a plurality of power consumptions of the plurality of real estate partitions over the plurality of instances in time from the plurality of electronic signals,
   derive the plurality of cumulative temperatures of the plurality of real estate partitions over the plurality of instances in time from the plurality of power consumptions, and
   color the plurality of real estate partitions over the plurality of instances in time with corresponding colors selected from among a plurality of colors associated with the plurality of cumulative temperatures to develop the plurality of thermal maps over the plurality of instances in time.

5. The system of claim 4, wherein the plurality of colors is associated with a plurality of ranges of power consumptions, and
   wherein the simulation application, when executed by the processor, configures the processor to:
      select corresponding ranges of power consumptions from among the plurality of ranges of power consumptions for the plurality of cumulative temperatures, and
      select the corresponding colors associated with the corresponding ranges.

6. The system of claim 1, wherein the simulation application, when executed by the processor, further configures the processor to:
   analyze the plurality of thermal maps to detect a three-dimensional thermal hotspot within the plurality of thermal maps.

7. The system of claim 6, wherein the simulation application, when executed by the processor, further configures the processor to:
   rank-order the three-dimensional thermal hotspot with other three-dimensional thermal hotspots within the plurality of thermal maps in accordance with their volumes, their intensities, their locations, or their durations within the plurality of thermal maps.

8. The system of claim 1, wherein the simulation application, when executed by the processor, configures the processor to:
   detect a three-dimensional thermal hotspot based on the plurality of hot partition maps, wherein detecting the three-dimensional thermal hotspot includes determining an overlap percentage between the plurality of hot partition maps and neighboring hot partition maps.

9. A method for developing a plurality of thermal maps for an electronic architectural design, the method comprising:
   simulating, by a processor, the electronic architectural design over a plurality of instances in time;
   capturing, by the processor, a plurality of electronic signals from the electronic architectural design as the electronic architectural design is being simulated over the plurality of instances in time;
   determining, by the processor, a plurality of power consumptions of the electronic architectural design over the plurality of instances in time from the plurality of electronic signals;
   deriving, by the processor, a plurality of cumulative temperatures for a plurality of real estate partitions of the electronic architectural design over the plurality of instances in time from the plurality of power consumptions;

mapping, by the processor, the plurality of cumulative temperatures onto an electronic circuit design real estate of the electronic architectural design to develop the plurality of thermal maps over the plurality of instances in time; and determine, by the processor, a plurality of hot partition maps from the plurality of thermal maps wherein the plurality of hot partition maps are indicative of one or more real estate partitions of the plurality of real estate partitions exceeding a temperature threshold.

10. The method of claim 9, wherein the determining comprises:

virtually partitioning the electronic circuit design real estate into the plurality of real estate partitions to develop an electronic circuit design real estate map, determining a plurality of power consumptions of the plurality of real estate partitions over the plurality of instances in time from the plurality of electronic signals, and coloring the plurality of real estate partitions over the plurality of instances in time with corresponding colors selected from among a plurality of colors associated with the plurality of power consumptions to develop a plurality of power consumption maps over the plurality of instances in time.

11. The method of claim 10, wherein the plurality of colors is associated with a plurality of ranges of power consumptions, and wherein the utilizing the plurality of electronic signals comprises further comprises:

selecting corresponding ranges of power consumptions from among the plurality of ranges of power consumptions for the plurality of power consumptions; and selecting the corresponding colors associated with the corresponding ranges.

12. The method of claim 9, wherein the deriving comprises:

virtually partition the electronic circuit design real estate into the plurality of real estate partitions to develop an electronic circuit design real estate map, determining a plurality of power consumptions of the plurality of real estate partitions over the plurality of instances in time from the plurality of electronic signals, deriving plurality of cumulative temperatures of the plurality of real estate partitions over the plurality of instances in time from the plurality of power consumptions, and wherein the mapping comprises:

coloring the plurality of real estate partitions over the plurality of instances in time with corresponding colors selected from among a plurality of colors associated with the plurality of cumulative temperatures to develop the plurality of thermal maps over the plurality of instances in time.

13. The method of claim 12, wherein the plurality of colors is associated with a plurality of ranges of power consumptions, and wherein the utilizing the plurality of power consumption maps further comprises:

selecting corresponding ranges of power consumptions from among the plurality of ranges of power consumptions for the plurality of power consumptions, and selecting the corresponding colors associated with the corresponding ranges.

14. The method of claim 9, further comprising:

analyzing, by the processor, the plurality of thermal maps to detect a three-dimensional thermal hotspot within the plurality of thermal maps.

15. The method of claim 14, further comprising:

rank-ordering, by the processor, the three-dimensional thermal hotspot with other three-dimensional thermal hotspots within the plurality of thermal maps in accordance with their volumes, their intensities, their locations, or their durations within the plurality of thermal maps.

16. A system for developing a plurality of thermal maps for an electronic architectural design, the system comprising:

a memory that stores a plurality of instructions; and a processor configured to execute the plurality of instructions, the plurality of instructions when executed by the processor, configuring the processor to:

determine a plurality of power consumptions of the electronic architectural design over the plurality of instances in time from a plurality of electronic signals captured from the electronic architectural design as the electronic architectural design is being simulated over a plurality of instances in time, utilize the plurality of power consumptions to derive a map of a plurality of cumulative temperatures for a plurality of real estate partitions of the electronic architectural design to develop the plurality of thermal maps over the plurality of instances in time, analyze the plurality of thermal maps to detect a three-dimensional thermal hotspot within the plurality of thermal maps, rank-order the three-dimensional thermal hotspot with other three-dimensional thermal hotspots within the plurality of thermal maps in accordance with their volumes, their intensities, their locations or their durations within the plurality of thermal maps, and simulate the electronic architectural design to generate the plurality of electronic signals.

17. The system of claim 16, wherein the plurality of instructions application, when executed by the processor, configures the processor to:

virtually partition an electronic circuit design real estate into a plurality of real estate partitions to develop an electronic circuit design real estate map, determine a plurality of power consumptions of the plurality of real estate partitions over the plurality of instances in time from the plurality of electronic signals, and color the plurality of real estate partitions over the plurality of instances in time with corresponding colors selected from among a plurality of colors associated with the plurality of power consumptions to develop a plurality of power consumption maps over the plurality of instances in time.

18. The system of claim 17, wherein the plurality of colors is associated with a plurality of ranges of power consumptions, and wherein the plurality of instructions, when executed by the processor, configures the processor to:

select corresponding ranges of power consumptions from among the plurality of ranges of power consumptions for the plurality of power consumptions, and select the corresponding colors associated with the corresponding ranges.

19. The system of claim 16, wherein the plurality of instructions application, when executed by the processor, configures the processor to:
- virtually partition the electronic circuit design real estate into the plurality of real estate partitions to develop an electronic circuit design real estate map,
- determine a plurality of power consumptions of the plurality of real estate partitions over the plurality of instances in time from the plurality of electronic signals,
- derive the plurality of cumulative temperatures of the plurality of real estate partitions over the plurality of instances in time from the plurality of power consumptions, and
- color the plurality of real estate partitions over the plurality of instances in time with corresponding colors selected from among a plurality of colors associated with the plurality of cumulative temperatures to develop the plurality of thermal maps over the plurality of instances in time.

20. The system of claim 19, wherein the plurality of colors is associated with a plurality of ranges of power consumptions, and
- wherein the simulation application, when executed by the processor, configures the processor to:
  - select corresponding ranges of power consumptions from among the plurality of ranges of power consumptions for the plurality of power consumptions, and
  - select the corresponding colors associated with the corresponding ranges.

* * * * *